UNITED STATES PATENT OFFICE.

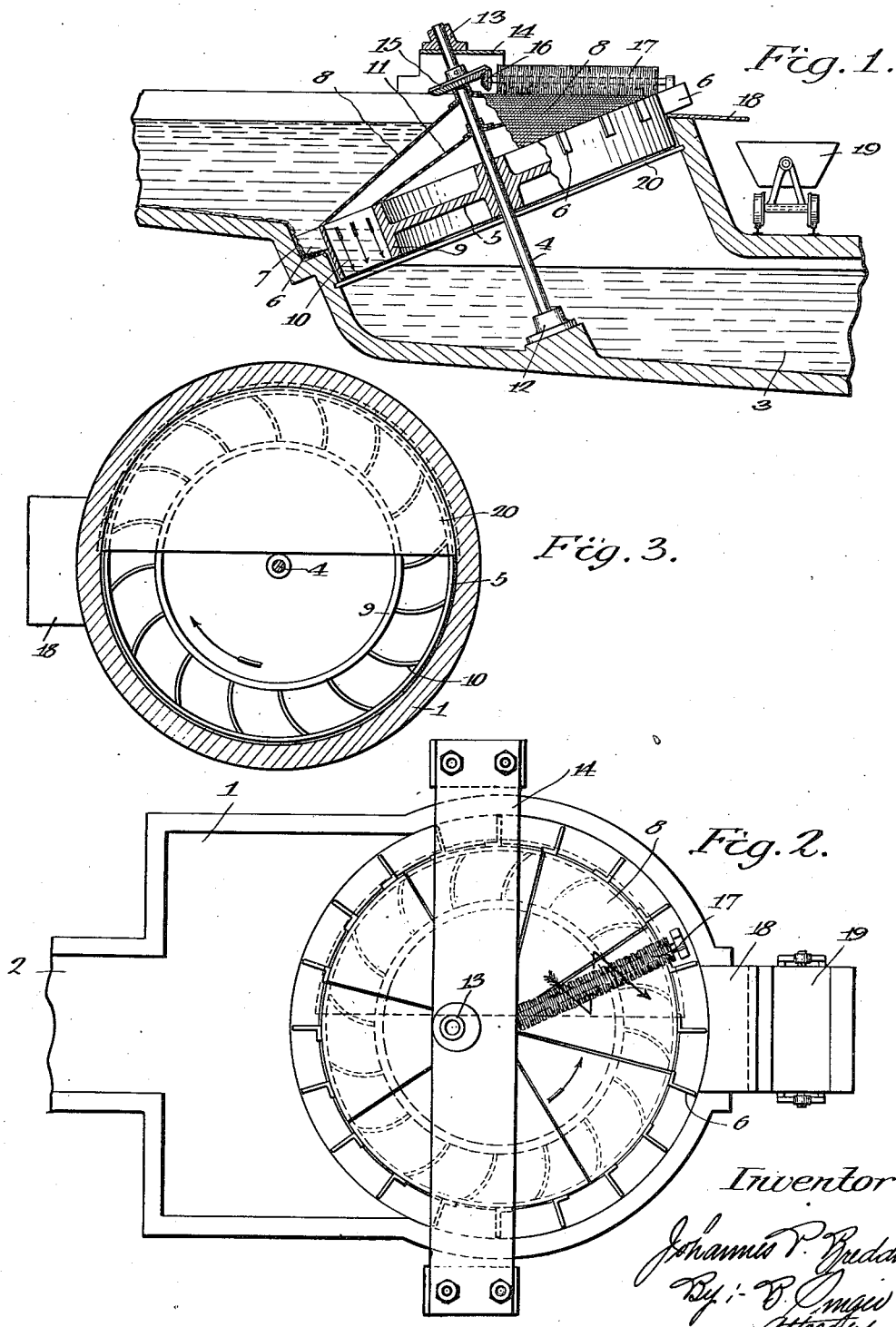

JOHANNES PAUL BREDDIN, OF COLOGNE, GERMANY.

APPARATUS FOR PURIFYING SEWAGE-WATER.

1,210,759.  Specification of Letters Patent.  Patented Jan. 2, 1917.

Application filed February 7, 1914. Serial No. 817,237.

*To all whom it may concern:*

Be it known that I, JOHANNES PAUL BREDDIN, a citizen of Germany, and resident of Hohepforte 12, Cologne, Germany, have invented certain new and useful Improvements in Apparatus for Purifying Sewage-Water, of which the following is a specification, such as will enable others skilled in the art to which it appertains to make and use the same.

This invention deals with appliances for the purification of sewage waters in which these waters pass through a disk or cone shaped sieve which is fixed on an inclined axis so that it can rotate on same and from which the suspended substances collected on the surface of the sieve, after they have been lifted above the upper level of the water, are swept off by means of a cylindrical brush and the floating and fatty substances are removed to the side of the level of the inflowing water by means of a horizontal conveyer, along a storage wall.

On the accompanying drawing there is shown:—In Figure 1 a purifying sieve for sewage water of this kind, illustrated. It is shown partly in vertical section and partly as a view of same without the appliance to catch the floating substances. Fig. 2 shows a top view of the above appliance. Fig. 3 shows a view from below of the conical sieve.

The cone shaped sieve appliance is as is usual, fitted in the bay shaped enlargement (1) of the conduit (2) of the inflowing waste water, at the point where it goes over as a circular shaped section in the form of a short hollow cylinder with an inclined axis in the outflow conduit (3) which is situated lower down and is mostly covered. The purifying sieve is arranged with an axis (4), which is inclined toward the cylindrical part of the conduit in such a manner, that it closes the conduit at this point.

The body of the purifying sieve is shaped on the outside as a cylindrical wheel (5), which, at the lower part of its circumference, fits closely to the masonry of the conduits on all sides; whereas, at the upper part of the wheel circumference there are attached a row of short wings (6) which transport and carry away the deposited substances from the gutter (7) in which they move in the well known manner, above the upper level of the water.

The wheel body (5) carries at its top side the cone shaped purifying sieve (8), the outer edge of which rests on the circumference ring of the wheel (5). Between this outer circumference ring and a similar inner cylindrical ring (9) there is the blade rim (10). The space of the wheel (5) inside this blade ring is preferably covered with a cone shaped guiding screen (11) which conducts the water passing through the sieve (8) to the wing of the turbine rim, that is to say to the cells of same.

The axis (4) of the conical sieve stands below in a foot bearing (12) and rests above in a neck bearing (13), which is supported by a bridge, below which for instance it carries a conical wheel (15), which, by means of a small conical toothed gear (16) drives a cylindrical brush (17), which is fitted in a bearing at the highest point close above the sieve surface (8) in such a manner that, rotating around its axis in a contrary direction to that of the surface of the sieve, it sweeps the waste substances collected on the surface of the sieve into the conveyer channel (18) from whence they are transported into another receptacle or into a tilting truck (19) provided for that purpose.

Below the wheel (5) there is a floor (20) made of iron plates or of wooden planks, which however leaves free the one half of the blade rim (10) or of the entire wheel from the highest to about the lowest point, (as is shown by Fig. 3). The interval between this floor (20) and the lowest part of the blade rim is made as small as possible, so that on the descending side the cells of the blades are practically closed below. When the water collected in the cells sinks downward on the inclined plane formed by the floor, it exercises—similar to a water wheel—a certain driving power.

As soon as the cells of the blade rim reach the lower edge of the floor (20), the water can flow out into the outflow conduit (3) and thereby still exercise a driving effect like that of a turbine. On the ascending side, the cells of the blade rim are permanently open below, so that no water can collect in them. The water which flows freely on this side of the blade rim through same exercises in the well known manner a driving power on the blade rim similar to that of a turbine.

From the axis (4) of the sieve wheel the necessary power can be transmitted in the usual manner to operate the transport appliance for taking off the floating substances from the surface of the inflowing water.

What I claim and desire to secure by Letters Patent is:—

1. Apparatus for purifying sewage water comprising a rotating sieve on an axis inclined to the vertical, a series of blades around the sieve and a floor under the descending side of the sieve.

2. Apparatus for purifying sewage water comprising a rotating sieve on an axis inclined to the vertical, a series of blades around the sieve, a floor under the descending side of the sieve, and a cover above the ascending side of the sieve.

3. Apparatus for purifying sewage water comprising a rotating sieve on an axis inclined to the vertical, a series of blades around the sieve and a floor under the descending side of the sieve, and a rotating brush driven by the rotation of the sieve for the purpose of sweeping debris from the top of the sieve.

4. Apparatus for purifying sewage water comprising a rotating sieve on an axis inclined to the vertical, a series of blades around the sieve, a floor under the descending side of the sieve, and a cover above the ascending side of the sieve, and a rotating brush driven by the rotation of the sieve for the purpose of sweeping debris from the top of the sieve.

5. Apparatus for purifying sewage water comprising a wheel on an axis inclined to the vertical, a conical rotating sieve above the wheel, a shield between the sieve and the wheel, a series of blades around the periphery of the sieve, and a floor under the blades on one side.

6. Apparatus for purifying sewage water comprising a wheel on an axis inclined to the vertical, a conical rotating sieve above the wheel, a shield between the sieve and the wheel, a series of blades around the periphery of the sieve, a floor under the blades on one side and a cover over the blades on the opposite side.

In testimony whereof I affix my signature in presence of two witnesses.

JOHANNES PAUL BREDDIN.

Witnesses:
  SUSANNA MOLL,
  JOSEPH PRÉGARDIEN.